United States Patent
Li et al.

(10) Patent No.: US 9,230,226 B2
(45) Date of Patent: Jan. 5, 2016

(54) CAPACITY EXPANSION PLANNING WITH PRODUCTION RESOURCE MANAGEMENT

(75) Inventors: Wen-Syan Li, Shanghai (CN); Gufei Sun, Shanghai (CN); Heng Wang, Shanghai (CN)

(73) Assignee: SAP SE, Walldorf (DE)

( * ) Notice: Subject to any disclaimer, the term of this patent is extended or adjusted under 35 U.S.C. 154(b) by 438 days.

(21) Appl. No.: 13/545,704

(22) Filed: Jul. 10, 2012

(65) Prior Publication Data
US 2014/0019186 A1    Jan. 16, 2014

(51) Int. Cl.
G06Q 10/06 (2012.01)

(52) U.S. Cl.
CPC .................... *G06Q 10/0631* (2013.01)

(58) Field of Classification Search
CPC ....................................... G06Q 10/06
See application file for complete search history.

(56) References Cited

U.S. PATENT DOCUMENTS

| | | | |
|---|---|---|---|
| 7,292,960 B1 * | 11/2007 | Srinivasa et al. | 702/185 |
| 2010/0161383 A1 * | 6/2010 | Butler | 705/10 |

* cited by examiner

*Primary Examiner* — Thomas Dixon
(74) *Attorney, Agent, or Firm* — Brake Hughes Bellermann LLP

(57) ABSTRACT

In accordance with aspects of the disclosure, systems and methods are provided for capacity planning management by generating a capacity expansion plan for a plurality of production resources used to produce one or more products relative to one or more time intervals. The systems and methods may include evaluating production patterns for each production resource to determine a production capacity within each time interval, evaluating budget patterns for each production resource to determine a production cash flow within each time interval, generating one or more potential capacity expansion forecasting schemes for each production resource and production budget based on the production patterns for each production resource and the budget patterns for each production budget, and generating the capacity expansion plan within each time interval based on the one or more potential capacity expansion forecasting schemes for each production resource and production budget.

21 Claims, 10 Drawing Sheets

CAPACITY EXPANSION PLANNING WITH PRODUCTION RESOURCE MANAGEMENT

TECHNICAL FIELD

The present description relates to computer-based techniques for capacity planning management.

BACKGROUND

Generally, manufacturing involves the making of products for sale, e.g., by constructing the products from component parts. Once produced, the products are often stored as inventory, e.g., in warehouse facilities, and ultimately shipped to retail stores or directly to consumers.

In a typical manufactory environment, every product may require multiple capacities to be built to generate profits. As many products may require different but possibly shared capacities and generate different profits as well as being demanded at different levels, capacity planning is a complex process. Further, such processes may be highly complex in that capacity expansion may require different price tags to improve production levels of products. As such, capacity planning is an important issue when trying to meet future demand and to analyze profitability with reference to upfront investment. Since many parameters and variables (e.g., types of capacity expansion options, monetary investment needed for each option, etc.) are introduced in a capacity planning process, decision-making and calculations to develop with a capacity expansion plan may be considered difficult. Therefore, there currently exists a need to simply the process by which capacity expansion is determined.

SUMMARY

In accordance with aspects of the disclosure, a computer system may be provided for capacity planning management including instructions recorded on a computer-readable medium and executable by at least one processor. The computer system may include a capacity planning manager configured to cause the at least one processor to generate a capacity expansion plan for a plurality of production resources used to produce one or more products relative to one or more time intervals. The capacity planning manager may include a production handler configured to retrieve information related to each production resource from a database and evaluate production patterns for each production resource to determine a production capacity within the one or more time intervals, a budget handler configured to retrieve information related to one or more production budgets from the database and evaluate budget patterns for each production resource to determine a production cash flow within the one or more time intervals, a forecast handler configured to generate one or more potential capacity expansion forecasting schemes for each production resource and production budget based on the production patterns for each production resource and the budget patterns for each production budget, and a production activity optimizer configured to generate the capacity expansion plan within the one or more time intervals based on the one or more potential capacity expansion forecasting schemes for each production resource and production budget.

In accordance with aspects of the disclosure, a computer-implemented method may be provided for capacity planning management. In an implementation, the computer-implemented method may include generating a capacity expansion plan for a plurality of production resources used to produce one or more products relative to one or more time intervals by retrieving information related to each production resource from a database, evaluating production patterns for each production resource to determine a production capacity within the one or more time intervals, retrieving information related to one or more production budgets from the database, evaluating budget patterns for each production resource to determine a production cash flow within the one or more time intervals, generating one or more potential capacity expansion forecasting schemes for each production resource and production budget based on the production patterns for each production resource and the budget patterns for each production budget, and generating the capacity expansion plan within the one or more time intervals based on the one or more potential capacity expansion forecasting schemes for each production resource and production budget.

In accordance with aspects of the disclosure, a computer program product may be provided, wherein the computer program product is tangibly embodied on a computer-readable storage medium and includes instructions that, when executed by at least one processor, may be configured to generate a capacity expansion plan for a plurality of production resources used to produce one or more products relative to one or more time intervals. The instructions, when executed by the at least one processor, may be further configured to retrieve information related to each production resource from a database, evaluate production patterns for each production resource to determine a production capacity within the one or more time intervals, retrieve information related to one or more production budgets from the database, evaluate budget patterns for each production resource to determine a production cash flow within the one or more time intervals, generate one or more potential capacity expansion forecasting schemes for each production resource and production budget based on the production patterns for each production resource and the budget patterns for each production budget, and generate the capacity expansion plan within the one or more time intervals based on the one or more potential capacity expansion forecasting schemes for each production resource and production budget.

The details of one or more implementations are set forth in the accompanying drawings and the description below. Other features will be apparent from the description and drawings, and from the claims.

DETAILED DESCRIPTION

Figure 1A:
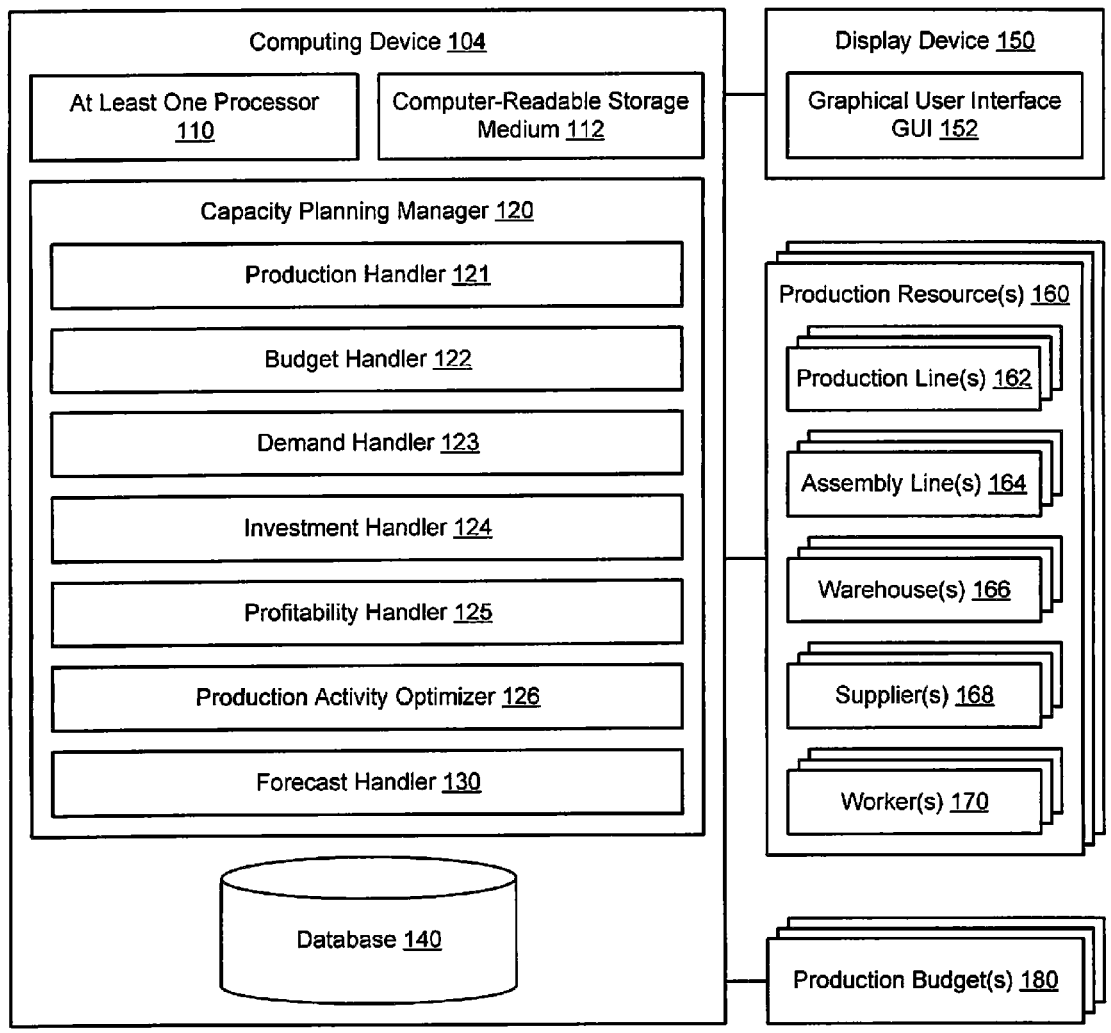
FIGS. 1A-1B are block diagrams illustrating example systems for capacity planning management, in accordance with aspects of the disclosure.

FIG. 1A is a block diagram illustrating an example system 100 for capacity planning management by implementing a forecast handler for capacity planning, in accordance with aspects of the disclosure.

In the example of FIG. 1A, the system 100 comprises a computer system for implementing a capacity planning management system that may be associated with a computing device 104, thereby transforming the computing device 104 into a special purpose machine designed to determine and implement capacity expansion planning process(es), as described herein. In this sense, it may be appreciated that the computing device 104 may include any standard element(s) and/or component(s), including at least one processor(s) 110, memory (e.g., non-transitory computer-readable storage medium) 112, database(s) 140, power, peripherals, and various other computing elements and/or components that may not be specifically shown in FIG. 1A. Further, the system 100 may be associated with a display device 150 (e.g., a monitor or other display) that may be used to provide a graphical user interface (GUI) 152. In an implementation, the GUI 152 may be used, for example, to receive preferences from a user for managing or utilizing the system 100. As such, it should be appreciated that various other elements and/or components of the system 100 that may be useful to implement the system 100 may be added or included, as would be apparent to one of ordinary skill in the art.

In the example of FIG. 1A, the capacity planning management system 100 may include the computing device 104 and instructions recorded on the computer-readable medium 112 and executable by the at least one processor 110. The capacity planning management system 100 may include the display device 150 for providing output to a user, and the display device 150 may include the graphical user interface (GUI) 152 for receiving input from the user.

The capacity planning management system 100 may include a capacity planning manager 120 configured to cause the at least one processor 110 to generate a capacity expansion plan for one or more production resources 160 used to produce one or more products relative to one or more time intervals. In production related environments, each product may use one or more capacities (i.e., resources), such as production line(s), assembly line(s), warehouse(s), supplier(s), worker(s), etc, to build products and generate profits. Since many products may require different but possibly shared capacities and generate different profits as well as being demanded at different levels, capacity planning comprises a complex process. Further, such processes may be made more complex in that capacity expansion may require different cost budgets and investment to improve production levels of some products. Nonetheless, capacity planning is an important issue in production and manufacturing environments to meet future demand and to analyze profitability with respect to upfront investment. When one or more additional parameters and/or variables (i.e., various types of capacity expansion options, investments options, etc) are introduced in a capacity planning process, decision-making and calculation to generate an optimal capacity expansion plan may not be feasible by a manual process or even by a computerized systematic search given the size of search space. As such, aspects of the disclosure provide various capacity expansion planning solutions for what-if analysis of product demand patterns (e.g., forecast schemes) and production scheduling algorithms. For instance, in reference to a fixed production budget, various aspects of the disclosure may be directed to generating an optimal capacity expansion plan that may generate most total profits. In another instance, if the production budget is used to build a capacity for producing products greater than a demand, various aspects of the disclosure may be directed to only building enough capacity to meet the demand. In still another instance, in reference to a demand beyond a current capacity of production resources, various aspects of the disclosure may be directed to determining a capacity expansion plan with a lowest needed production budget to produce demanded products.

In the example of FIG. 1A, the capacity planning manager 120 may include a production handler 121 configured to retrieve information related to each production resource 160 from the database 140 and evaluate production patterns for each production resource 160 to determine a production capacity within the one or more time intervals. In an implementation, each production resource 160 may include one or more of at least one production line 162, at least one assembly line 164, at least one warehouse 166, at least one supplier 168, and at least one worker or group of workers 170.

In the system 100, the capacity planning manager 120 may be configured to schedule operations of the one or more production resources 160, which may include one or more manufacturing facilities, with respect to one or more associated production lines 162 (e.g., part production lines), assembly lines 164, warehouses 166, suppliers 168 (e.g., parts suppliers, supply-chains, etc.), and workers 170. The capacity planning manager 120 may be configured to schedule operations to optimize the one or more production resources 160 in a desired manner, while meeting demand and providing a desired level of availability of products for sale to consumers. As described herein, the capacity planning manager 120 may achieve these goals in a fast, efficient, repeatable manner, and for widely-ranging examples of numbers, types, and job requirements of various capacity planning scenarios.

In the example of FIG. 1, each production resource 160 may include one or more production resources including, for example, one or more production lines 162, assembly lines 164, warehouses 166, suppliers 168, and workers 170. For instance, the production line(s) 162 may be used to produce component parts, and the assembly line(s) 164 may be used to assemble such components parts, together, and/or with parts received from supplier(s) 168, into products for sale. In another instance, along such assembly line(s) 164, separate assembly stations may be designated at which worker(s) 160 (e.g., machine operator(s), assembler(s), etc.) perform a repeated assembly task in a highly-specialized and efficient manner, so that the sum total of such assembly tasks results in completion of the product for sale. In an example of such assembly lines, an automobile may be mass produced by assembling component parts (e.g., frame, windshield, doors, engine, and so on) into a finished automobile.

In an implementation, the production line(s) 162 and assembly line(s) 164 are mere examples of production resources 160 for manufacturing facilities, and other examples may be used. Similarly, the supplier(s) 168 may be considered examples of suppliers ranging from, for example, local wholesalers to providers located in a different parts of the country. In any event, the capacity planning manager 120 may accomplish a goal of dealing with these and other obstacles inherent to a production and manufacturing process, so as to enable capacity expansion planning in such a manner that enables the operator of the production resource(s) 160 to accomplish a desired goal of, for example, optimizing production capacity and/or profitability.

In another implementation, the capacity planning manager 120 may be configured to utilize historical sales data stored in the database 140 for product to be manufactured to provide a predicted level of demand by consumers. Such forecasts may be short-term and/or long-term and may be made with varying levels of specificity, e.g., with respect to various customer demographics, seasonal variations in sales levels, and various other variables. In specific examples, the capacity planning manager 120 may use regression techniques to make sales forecasts.

Further, the capacity planning manager 120 may use various other types of data stored in the database 140 related to constraints which may be known or thought to influence, control, and/or otherwise constrain operations of the production resource(s) 160 including manufacturing facilities. For instance, data related to the warehouse(s) 166 may be stored in the database 140, and the warehouse data may describe a current, historical, and/or maximum capacity of the warehouse(s) 166. The warehouse data may describe time/cost constraints associated with transporting products. In another instance, data related to the supplier(s) 168 may be stored in the database 140, and the supplier data may describe past, present, and/or predicted data about the each supplier 168, such as, for example, typical delivery times for each part, production capacity of each supplier 168, and cost analysis information including volume discounts (or other costs discounts) associated with each supplier 168. In still another instance, data related to the each production line 162 and each assembly line 164 may be stored in the database 140 may describe data associated with past, present, and/or predicted operations (e.g., production capacity) of each production line 162 and each assembly line 164. For example, such data may include cost(s) in time and capital of switching operations from a first product to a second product, since such switches may be necessary and may vary widely in extent to which line operators need to re-tool or otherwise re-configure.

It should be appreciated that any example data is intended merely as non-limiting examples, and any additional and/or alternative types of data may be used in the operations of the capacity planning manager 120. For instance, data may be stored, e.g., in one or more databases 140 and/or elsewhere, regarding an extent to which different products to be produced share the same part(s). In an example, when automobiles are produced, two different types of cars may use the same braking system and related part(s). Such common usages of parts may reduce a cost associated with switching the assembly line(s) 164 from assembling the first car to assembling the second car.

In some instances, such constraint data may be related to the one or more production resource(s) 160 and may further relate to, or be defined by, the nature and/or type of manufacturing facility and/or products being produced in question. In some instances, the production resource(s) 160 may not utilize assembly line(s) 164, and may instead use dedicated workstations at each of which worker(s) 170 (e.g., machine operator(s), assembler(s), etc.) construct a product for sale from start-to-finish. In some other instances, the production resource(s) 160 may conduct testing (e.g., for quality control) on partially or completely finished products for sale. In these and other scenarios and situations, the capacity planning manager 120 may be instrumental in allocating associated production resource(s) 160 in one or more time intervals, so as to achieve a desired business goal. Thus, in some examples, the capacity planning manager 120 may be configured to select an optimal or near-optimal capacity plan solution that defines specific time intervals during which associated production resource(s) 160 (e.g., production lines 162, assembly lines 164, warehouses 166, suppliers 168, and workers 170) may be used to obtain a desired result.

In the example of FIG. 1A, the capacity planning manager 120 may include a budget handler 122 configured to retrieve information related to one or more production budgets 180 from the database 140 and evaluate budget patterns for each production resource 160 to determine a production cash flow within the one or more time intervals. In an implementation, each production budget 180 may refer to a capacity plan indicating a number of product units that may be produced during a time interval to meet consumer demand, profitability, and/or investment needs. Each production budget 180 may refer to a capacity expansion plan indicating a number of product units that may be produced during a future time interval to meet future consumer demand, profitability, and/or investment needs. Each production budget 180 may refer to a production schedule for producing a number of expected product units.

In another implementation, each production budget 180 may refer to a quantity of capital (i.e., monetary expenditures) needed for production of one or more specific products. In some examples, each production budget 180 may involve the identification and estimation of cost products for each phase of production (e.g., research, development, pre-production, production, post-production, and distribution). In some instances, each production budget 180 may be prepared after preparing a sales budget, and each production budget 180 may list a number of product units that should be produced during each budget period (i.e., time interval) to meet consumer demand, profitability, and/or investment needs. In some instances, production requirements for a specific time period may be influenced by carefully planned inventory.

In the example of FIG. 1A, the capacity planning manager 120 may include a demand handler 123 configured to determine a future demand for the one or more products during the one or more time intervals. In general, demand may refer to a desirability of a particular product by a consumer or group of consumers, and demand may further refer to an ability or a willingness to buy a particular commodity at a given point of time by a consumer or group of consumers.

In the example of FIG. 1A, the capacity planning manager 120 may include an investment handler 124 configured to determine upfront capital investment needed to implement the capacity expansion plan for each production resource 160 used to produce the one or more products within the one or more time intervals. In general, investment may refer to monetary support needed for producing or manufacturing a product with an expectation of gain or profit within an expected period of time.

In the example of FIG. 1A, the capacity planning manager 120 may include a profitability handler 125 configured to determine a profitability level for the one or more products during the one or more time intervals. In various implementations, the profitability handler 125 may be configured to determine the profitability level relative to the future demand for the one or more products during the one or more time intervals and/or relative to the upfront capital investment needed to produce the one or more products within the one or more time intervals.

In the example of FIG. 1A, the capacity planning manager 120 may include a production activity optimizer 126 configured to generate the capacity expansion plan within the one or more time intervals based on one or more potential capacity expansion forecasting schemes for each production resource 160 and each production budget 180. In an implementation, one or more of the production budgets 180 may include a fixed production budget, and the production activity optimizer 126 may be configured to generate the capacity expansion plan with a highest profitability level while meeting a future demand for each product. In another implementation, one or more of the production budgets 180 may include a lowest needed production budget, and the production capacity may include a current production capacity. In this instance, the production activity optimizer 126 may be configured to generate the capacity expansion plan with the lowest needed budget to produce each product for a future demand that is greater than the current production capacity. These and other aspects of the disclosure is described in greater detail herein.

In the example of FIG. 1A, the capacity planning manager 120 may include a forecast handler 130 configured to generate the one or more potential capacity expansion forecasting schemes for each production resource 160 and production budget 180 based on the production patterns for each production resource 160 and the budget patterns for each production budget 180.

In an implementation, the forecast handler 130 may be configured to generate the one or more potential capacity expansion forecasting schemes for each production resource 160 and production budget 180 based on the production patterns for each production resource 160 and the budget patterns for each production budget 180 while meeting the future demand.

In an implementation, the forecast handler 130 may be configured to generate the one or more potential capacity expansion forecasting schemes for each production resource 160 and production budget 180 based on the production patterns for each production resource 160 and the budget patterns for each production budget 180 while meeting the profitability level.

In an implementation, the forecast handler 130 may be configured to generate the one or more potential capacity expansion forecasting schemes for each production resource 160 and production budget 180 based on the production patterns for each production resource 160 and the budget patterns for each production budget 180 while meeting the upfront capital investment.

Therefore, in various implementations, the forecast handler 130 may be configured to generate the one or more potential capacity expansion forecasting schemes for each production resource 160 and production budget 180 based on the production patterns for each production resource 160 and the budget patterns for each production budget 180 while meeting at least one of the future demand, the upfront capital investment, and the profitability level. In this instance, the production activity optimizer 126 may be further configured to evaluate each potential capacity expansion forecasting scheme for each production resource and each production budget and select a best potential capacity expansion forecasting scheme by considering one or more of the future demand for each product, the profitability level for each product, and the upfront capital investment needed for each product.

In accordance with aspects of the disclosure, the capacity planning manager 120 in conjunction with the forecast handler 130 may be used to generate a capacity expansion plan to include a particular production schedule solution for use in scheduling an actual usage(s) of the production resources 160 including one or more of the production line(s) 162, the assembly line(s) 164, the warehouse(s) 166, the supplier(s) 168, and the worker(s) or group of workers 170. These and various other related aspects are described in greater detail herein.

In accordance with aspects of the disclosure, input to the capacity planning may include a given or forecasted demand and an optional budget. For instance, if the optional budget is given, a proposed capacity planning scheme may be configured to generate an optimal capacity expansion plan. In another instance, if the optional budget is not given, a proposed capacity planning scheme may be configured to generate an optimal capacity expansion plan with a lowest cost. The capacity planning manager 120 may be configured with a scheduling algorithm that may provide for effective demand driven production scheduling.

In accordance with aspects of the disclosure, the capacity planning manager 120 is configured to generate a capacity expansion plan for a given demand pattern, a given production scheduling method, and an optional budget. If the budget is fixed and less than the cost of capacity expansion to meet all new demands, the capacity planning manager 120 may be configured to generate a capacity expansion plan that improves profitability. If the budget has no particular constraint(s), the capacity planning manager 120 may be configured to generate a capacity expansion plan with a lowest budget that generates maximum profits by producing all demanded products. In various implementations, since various products may use different but possibly shared capacities and generate different profits as well as being demanded at different levels, each capacity expansion plan may utilize different production resources and/or different production budgets to improve production levels of a subset of products.

In accordance with aspects of the disclosure, there are types of production financial activities that may impact daily production capacity and production cash flow levels. Some examples include asset related activities for accounts receivable and liability related activities for accounts payable. Asset related activities for accounts receivable may refer to revenue, income, and/or cash inflow to the cash reserve, and liability related activities for accounts payable may refer to debt, payment, and/or cash outflow from the cash reserve.

In an aspect of the disclosure, example requirement(s) for capacity planning management provides for maintaining a desirable or predetermined cash reserve level that may be set in a desired or predetermined manner. For instance, the working capital or cash reserve should be maintained above a TCRL. However, the working capital or cash reserve may drop below a LCRL for a particular number of days over a period or a number of consecutive days in a period. However, the working capital or cash reserve should not drop below a CCRL at any time. Since working capital or cash inflow may only be estimated and not controlled, then as accounts receivables are received as revenue, at least one parameter may be configured that refers to a confidence (or risk) level of a cash inflow estimation strategy.

In the example of FIG. 1A, it should be appreciated that the capacity planning management system 100 is illustrated using various functional blocks or modules that represent more-or-less discrete functionality. However, such illustration is provided for clarity and convenience, and thus, it should be appreciated that the various functionalities may overlap or be combined within a described block(s) or module(s), and/or may be implemented by one or more block(s) or module(s) not specifically illustrated in the example of FIG. 1A. Generally, it should be appreciated that conventional functionality that may be considered useful to the system 100 of FIG. 1A may be included as well even though such conventional elements are not illustrated explicitly, for the sake of clarity and convenience.

Figure 1B:
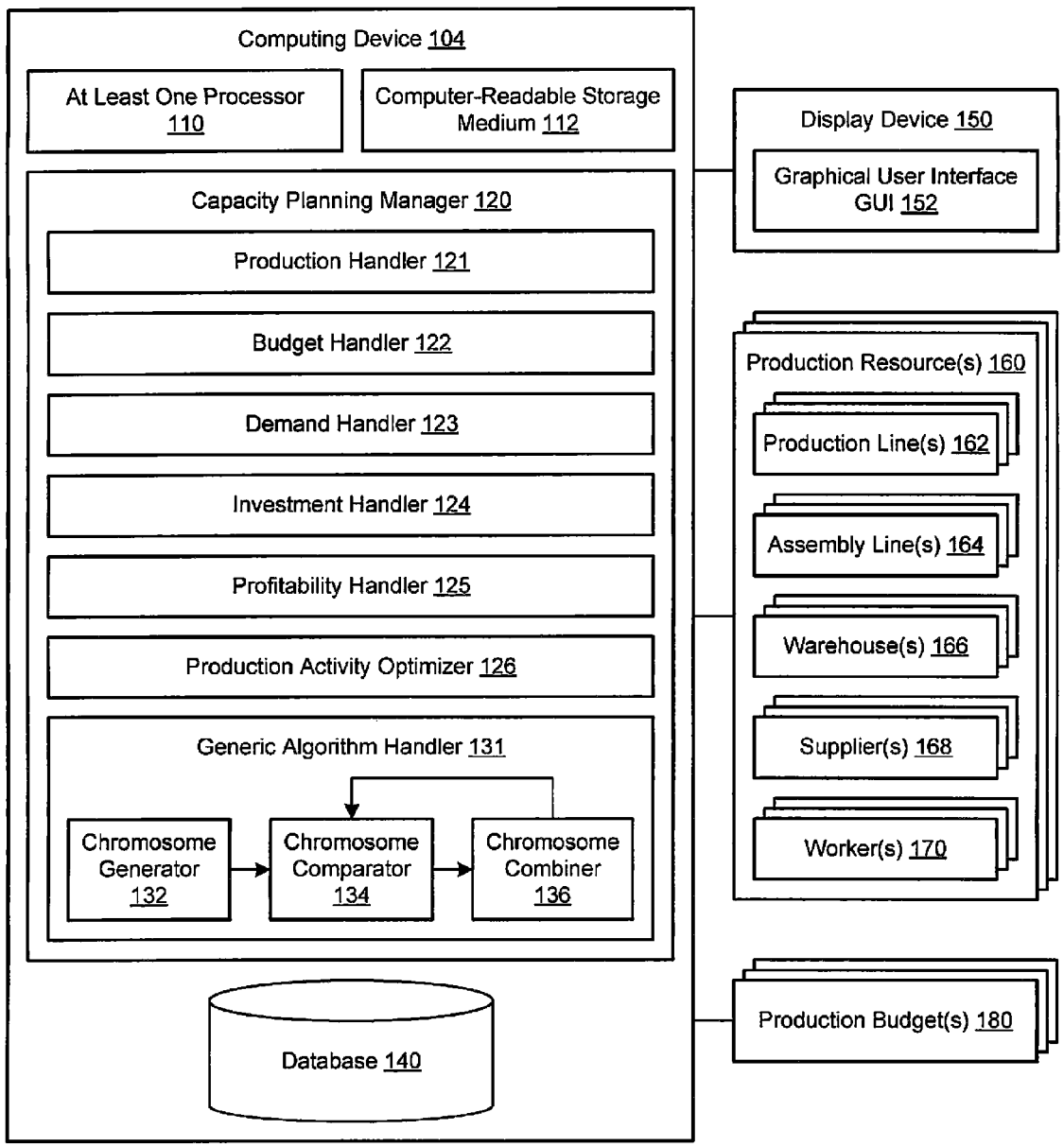

FIG. 1B is a block diagram illustrating an example system 150 for capacity planning management by implementing a genetic algorithm for capacity planning, in accordance with aspects of the disclosure.

In an implementation, the system 150 comprises a computer system for implementing a capacity planning management system that may be associated with the computing device 104 of the system 100 of FIG. 1A. As such, to simplify the following discussion, similar components of the system 150 of FIG. 1B may include the same scope and functionality of the system 100 of FIG. 1A, thereby transforming the computing device 104 of FIG. 1B into a special purpose machine designed to determine and implement capacity expansion planning process(es), as described herein.

In an implementation, the forecast handler 130 of the system 100 of FIG. 1A may be configured as a genetic algorithm handler 131. Therefore, in the example of FIG. 1B, the capacity planning manager 120 of the system 150 may include the genetic algorithm handler 131 that may be configured to implement a randomized algorithm approach known as a genetic algorithm (GA), which may refer generally to a computer simulation of Darwinian natural selection that iterates through successive generations to converge toward a best solution in a problem/solution space. Such a genetic algorithm may be used by the system 150 to consider requirements and/or related parameters (e.g., cash reserves) into the capacity expansion optimization process. Further, the capacity planning management system 150 may be considered capable of recommending and/or selecting "best-available" capacity plans, as described herein.

In the system 150, the genetic algorithm approach may be implemented, for example, by creating a "chromosome" representing a possible solution to the problem of generating a capacity expansion plan. Specific examples of such capacity expansion forecast chromosomes are described herein. However, generally speaking, it should be appreciated that such capacity expansion forecast chromosomes may include one or more potential capacity expansion forecasting schemes for each production resource 160 and production budget 180 based on the production patterns for each production resource 160 and the budget patterns for each production budget 180.

Further, it should be appreciated that such potential capacity expansion forecasting schemes may be used to compare each of the capacity expansion forecast chromosomes relative to the production capacity and production cash flow, to thereby output a selected subset of capacity expansion forecast chromosomes. Therefore, there may be a single such capacity expansion forecast chromosome that may represent the single best capacity expansion solution for a given set of capacity expansion objectives to thereby optimize profits. However, optimization of cash flow forecasting schemes (i.e., capacity expansion forecast chromosomes) may be relative to needs of a user and various other factors parameters, and/or requirements. Due to the nature of the genetic algorithms used herein, the capacity planning manager 120 may be configured to find a "best" solution that is close to an optimal solution, even if the actual optimal solution is not identifiable as such.

In this regard, the capacity planning manager 120 may be configured to optimize capacity planning relative to one or more objectives. One such metric may include profitability. For example, some investments may be more profitable than others, and/or profitability may be enhanced by exhibiting a preference for behaviors associated with increased profitability. On the other hand, other additional or alternative metrics may have value besides pure profitability. For instance, a gain in market share may be a valuable metric to consider.

As such, in an example, the production activity optimizer 126 may be configured for tuning preferences to provide designations between possible objectives of the capacity planning manager 120, and it should be appreciated that various factors, parameters, and/or requirements may be considered to be necessary or optional. For instance, in scenarios in which profitability should be optimized, a full utilization of the genetic algorithm may be an option but may not be a requirement.

The capacity planning manager 120 may be configured to utilize the genetic algorithm via the genetic algorithm handler 131 to create, compare, and combine multiple capacity expansion forecast chromosomes in a manner to thereby create a new generation or population of capacity expansion forecast chromosomes for evaluation so that a subset thereof may be selected for reproduction and subsequent evaluation. In this way, each generation and/or population of capacity expansion forecast chromosomes may tend to converge toward an optimal solution for capacity expansion planning. The production activity optimizer 126 may be configured to select a particular one of the capacity expansion solutions (i.e., potential capacity expansion forecasting schemes or capacity expansion forecast chromosomes) for use in capacity expansion planning.

In the example of FIG. 1B, the genetic algorithm handler 131 may include the chromosome generator 132 configured for generating one or more capacity expansion forecast chromosomes. Such capacity expansion forecast chromosome generation may occur at random or may include some initial guidelines or restrictions. The chromosome generator 132 may be configured to generate an initial population or set of capacity expansion forecast chromosomes, which may be evaluated by the chromosome comparator 134 configured for comparing each capacity expansion forecast chromosome including the one or more potential capacity expansion forecasting schemes for each production resource 160 and production budget 180 within the one or more time intervals based on the production patterns for each production resource 160 and the budget patterns for each production budget 180. The chromosome generator 132 may be configured to compare each of the plurality of capacity expansion forecast chromosomes relative to the relative to the production capacity and the production cash flow, to thereby output a selected subset of the plurality of capacity expansion forecast chromosomes, which may preferably represent the best available cash flow forecasting scheme. These and various other related aspects are described in greater detail herein.

The chromosome combiner 136 may be configured to receive the selected subset of the plurality of capacity expansion forecast chromosomes and may be configured to combine (e.g., crossover and mutate) capacity expansion forecast chromosomes of the selected subset of the plurality of capacity expansion forecast chromosomes to obtain a next generation (population) of capacity expansion forecast chromosomes for output to the chromosome comparator 134, which may then perform another, subsequent comparison therewith of the next generation of capacity expansion forecast chromosomes with consideration of the production capacity and the production cash flow, as part of an evolutionary loop of successive generations of the plurality of capacity expansion forecast chromosomes between the chromosome comparator 134 and the chromosome combiner 136. In an implementation, with each successive generation, the new population of capacity expansion forecast chromosomes may represent or include possible improved or near-optimal schedule(s). New generations/populations may be iteratively created until either an optimal solution is met, or until factors, preferences, and/or requirements are met up to some pre-defined satisfactory level or threshold, or until a pre-determined number of generations is calculated, or until time runs out to compute new generations/populations (at which point a best solution of the current generation may be selected).

The production activity optimizer 126 may be configured to monitor the evolutionary loop and to select a selected capacity expansion forecast chromosome therefrom for implementation of the capacity expansion plan based thereon. As referenced herein, the selected capacity expansion forecast chromosome/solution may represent either a best (optimal or near optimal) solution, or may represent a best-available solution. Thus, the production activity optimizer 126 may be tasked with determining whether, when, and how to interrupt or otherwise end the evolutionary loop and extract the best, best-available, optimal, or near optimal solution. Then, the production activity optimizer 126 may output a selected capacity expansion forecast chromosome and/or execute an actual capacity plan.

In the example of FIG. 1B, the chromosome combiner 136 may be further configured to combine the capacity expansion forecast chromosomes including selecting pairs of capacity expansion forecast chromosomes and crossing over portions of each pair of capacity expansion forecast chromosomes to obtain a child chromosome of the next generation. In an implementation, at least a portion of the evolutionary loop may be executed using parallel processes in which each generation of capacity expansion forecast chromosomes is divided into sub-groups for parallel processing thereof. In this instance, the production activity optimizer 126 may be further configured to select the selected capacity expansion forecast chromosome after a predetermined number of generations of the evolutionary loop, or after determining that the selected capacity expansion forecast chromosome satisfies the production capacity and the production cash flow.

In the example of FIG. 1B, it should be appreciated that the capacity planning management system 150 is illustrated using various functional blocks or modules that represent more-or-less discrete functionality. However, such illustration is provided for clarity and convenience, and thus, it should be appreciated that the various functionalities may overlap or be combined within a described block(s) or module(s), and/or may be implemented by one or more block(s) or module(s) not specifically illustrated in the example of FIG. 1B. Generally, it should be appreciated that conventional functionality that may be considered useful to the system 150 of FIG. 1B may be included as well even though such conventional elements are not illustrated explicitly, for the sake of clarity and convenience.

Figure 2:
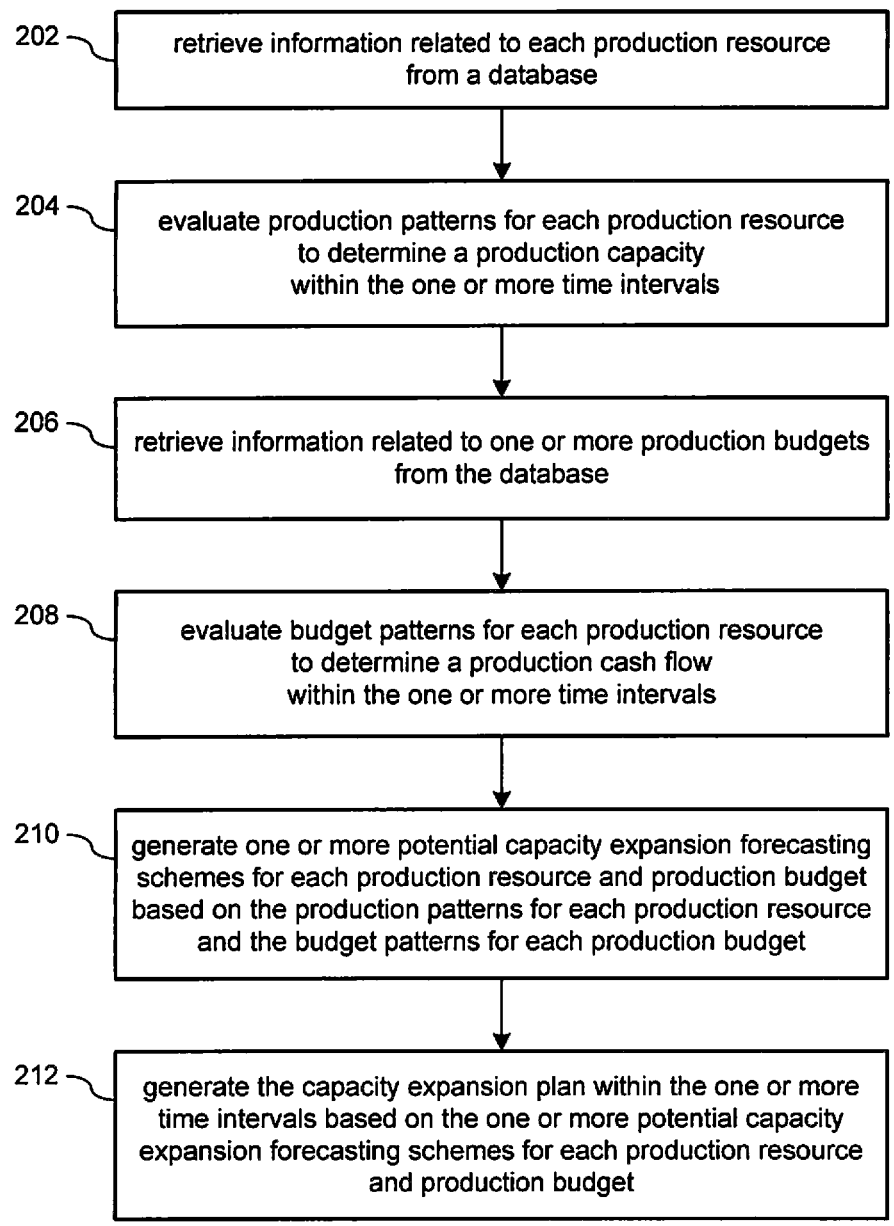
FIGS. 2-4 are process flows illustrating various example methods for managing capacity planning, in accordance with aspects of the disclosure.

FIG. 2 is a process flow illustrating an example method 200 for managing capacity planning, in accordance with aspects of the disclosure.

In the example of FIG. 2, operations 202-212 are illustrated as discrete operations occurring in sequential order. However, it should be appreciated that, in other implementations, two or more of the operations 202-212 may occur in a partially or completely overlapping or parallel manner, or in a nested or looped manner, or may occur in a different order than that shown. Further, additional operations, that may not be specifically illustrated in the example of FIG. 2, may also be included in some implementations, while, in other implementations, one or more of the operations 202-212 may be omitted. Further, in various implementations, the method 200 may include a process flow for a computer-implemented method for managing capacity planning in the system 100 of FIG. 1A and the system 150 of 1B. Further, as described herein, the operations 202-212 may provide a simplified operational process flow that may be enacted by the computer system 104 to provide features and functionalities as described in reference to FIGS. 1A and 1B.

In an aspect of the disclosure, the method 200 of FIG. 2 may be provided for generating a capacity expansion plan for one or more production resources 160 used to produce one or more products relative to one or more time intervals. In a production environment, each product uses production resources 160, such as production lines 162, assembly lines 164, warehouses 166, suppliers 168, and workers 170.

In the example of FIG. 2, at 202, the method 200 may include retrieving information related to each production resource 160 from the database 140. At 204, the method 200 may include evaluating production patterns for each production resource 160 to determine a production capacity within the one or more time intervals. At 206, the method 200 may include retrieving information related to one or more production budgets 180 from the database 140. At 208, the method 200 may include evaluating budget patterns for each production resource 160 to determine a production cash flow within the one or more time intervals. At 210, the method 200 may include generating one or more potential capacity expansion forecasting schemes for each production resource 160 and production budget 180 based on the production patterns for each production resource 160 and the budget patterns for each production budget 180. At 212, the method 200 may include generating the capacity expansion plan within the one or more time intervals based on the one or more potential capacity expansion forecasting schemes for each production resource 160 and production budget 180.

In an implementation, the method 200 may further include determining a future demand for the one or more products during the one or more time intervals and generating the one or more potential capacity expansion forecasting schemes for each production resource 160 and production budget 180 based on the production patterns for each production resource 160 and the budget patterns for each production budget 180 while meeting the future demand.

In an implementation, the method 200 may further include determining a profitability level for the one or more products during the one or more time intervals and generating the one or more potential capacity expansion forecasting schemes for each production resource 160 and production budget 180 based on the production patterns for each production resource 160 and the budget patterns for each production budget 180 while meeting the profitability level.

In an implementation, the method 200 may further include determining upfront capital investment needed to implement the capacity expansion plan for each production resource used to produce the one or more products within the one or more time intervals and generating the one or more potential capacity expansion forecasting schemes for each production resource 160 and production budget 180 based on the production patterns for each production resource 160 and the budget patterns for each production budget 180 while meeting the upfront capital investment.

Therefore, in various implementations, the method 200 may include one or more of determining a future demand for the one or more products during the one or more time intervals, determining upfront capital investment needed to implement the capacity expansion plan for each production resource used to produce the one or more products within the one or more time intervals, and determining a profitability level relative to the future demand for the one or more products during the one or more time intervals and further relative to the upfront capital investment needed to produce the one or more products within the one or more time intervals. In this instance, the method 200 may include generating the one or more potential capacity expansion forecasting schemes for each production resource 160 and production budget 180 based on the production patterns for each production resource 160 and the budget patterns for each production budget 180 while meeting one or more the future demand, the upfront capital investment, and the profitability level.

In another implementation, the one or more production budgets 180 may include at least one fixed production budget, and in this instance, the method 200 may include generating the capacity expansion plan with a highest profitability level while meeting a future demand for each product, which is described in greater detail herein.

In still another implementation, the one or more production budgets 180 may include a lowest needed production budget, and the production capacity may include a current production capacity. In this instance, the method 200 may include generating the capacity expansion plan with the lowest needed budget to produce each product for a future demand that is greater than the current production capacity, which is described in greater detail herein.

Figure 3:
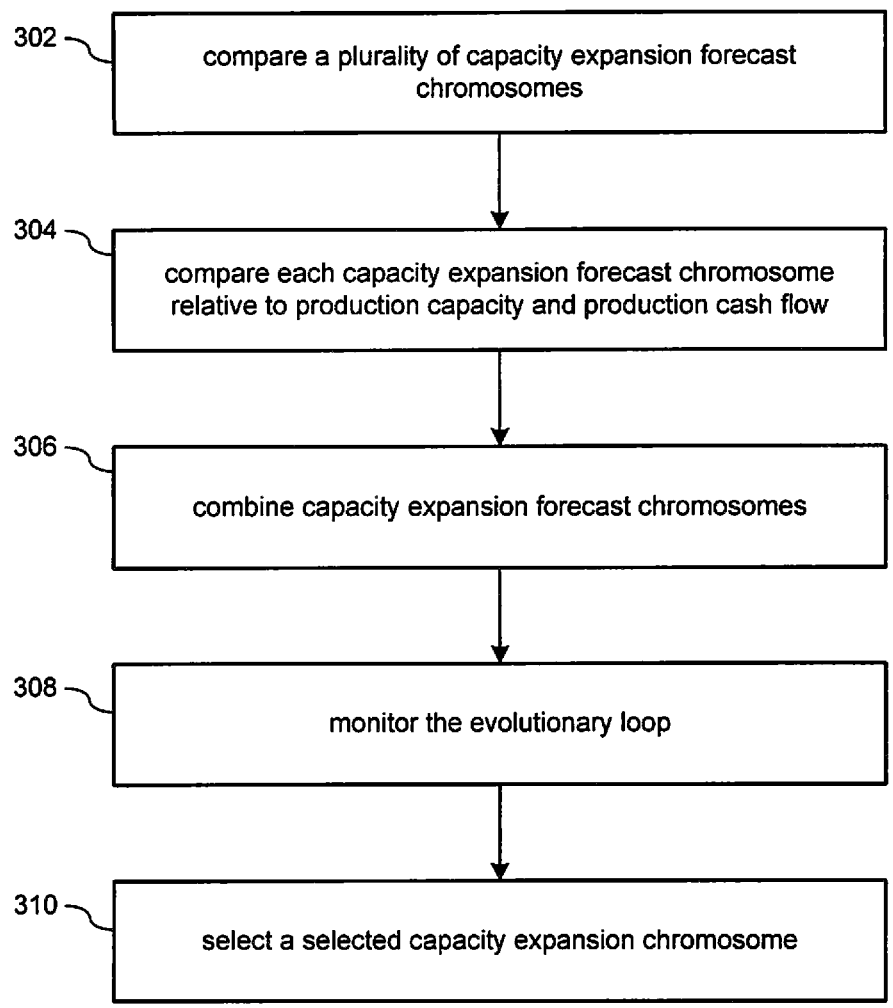

FIG. 3 is a process flow illustrating another example method 300 for managing capacity planning, in accordance with aspects of the disclosure.

In the example of FIG. 3, operations 302-308 are illustrated as discrete operations occurring in sequential order. However, it should be appreciated that, in other implementations, two or more of the operations 302-308 may occur in a partially or completely overlapping or parallel manner, or in a nested or looped manner, or may occur in a different order than that shown. Further, additional operations, that may not be specifically illustrated in the example of FIG. 3, may also be included in some implementations, while, in other implementations, one or more of the operations 302-308 may be omitted. Further, in various implementations, the method 300 may include a process flow for a computer-implemented method for managing capacity planning in the system 100 of FIG. 1A and the system 150 of 1B. Further, as described herein, the operations 302-308 may provide an expanded operational process flow for operation 210 of method 200 of FIG. 2 that may be enacted by the computer system 104 to provide features and functionalities as described in reference to FIGS. 1A and 1B.

In an aspect of the disclosure, the method 300 of FIG. 3 may be provided for generating one or more potential capacity expansion forecasting schemes for each production resource 160 and production budget 180 based on the production patterns for each production resource 160 and the budget patterns for each production budget 180.

In the example of FIG. 3, at 302, the method 300 may include comparing a plurality of capacity expansion forecast chromosomes, wherein each capacity expansion forecast chromosome may include one or more potential capacity expansion forecasting schemes for each production resource 160 and production budget 180 within the one or more time intervals based on the production patterns for each production resource 160 and the budget patterns for each production budget 180.

At 304, comparing each capacity expansion forecast chromosome relative to the production capacity and the production cash flow to thereby output a selected subset of the plurality of capacity expansion forecast chromosomes.

At 306, the method 300 may include combining capacity expansion forecast chromosomes of the selected subset of the plurality of capacity expansion forecast chromosomes to obtain a next generation of capacity expansion forecast chromosomes for output and for subsequent comparison therewith of the next generation of capacity expansion forecast chromosomes with respect to the production capacity and the production cash flow, as part of an evolutionary loop of the plurality of capacity expansion forecast chromosomes.

At 308, the method 300 may include monitoring the evolutionary loop, and at 310, the method 300 may include selecting a selected capacity expansion chromosome therefrom for implementation of the capacity expansion plan based thereon.

In an implementation, the method 300 may further include combine the capacity expansion forecast chromosomes including selecting pairs of capacity expansion forecast chromosomes and crossing over portions of each pair of capacity expansion forecast chromosomes to obtain a child chromosome of the next generation.

In an implementation, the method 300 may further include executing at least a portion of the evolutionary loop using parallel processes in which each generation of capacity expansion forecast chromosomes is divided into sub-groups for parallel processing thereof. The method 300 may further include selecting the selected capacity expansion forecast chromosome after a predetermined number of generations of the evolutionary loop, or after determining that the selected capacity expansion forecast chromosome satisfies the production capacity and the production cash flow.

In an implementation, the method 300 may further include evaluating each potential capacity expansion forecasting scheme for each production resource and each production budget and selecting a best potential capacity expansion forecasting scheme by considering one or more of a future demand for each product, a profitability level for each product, and an upfront capital investment needed for each product.

Figure 4:
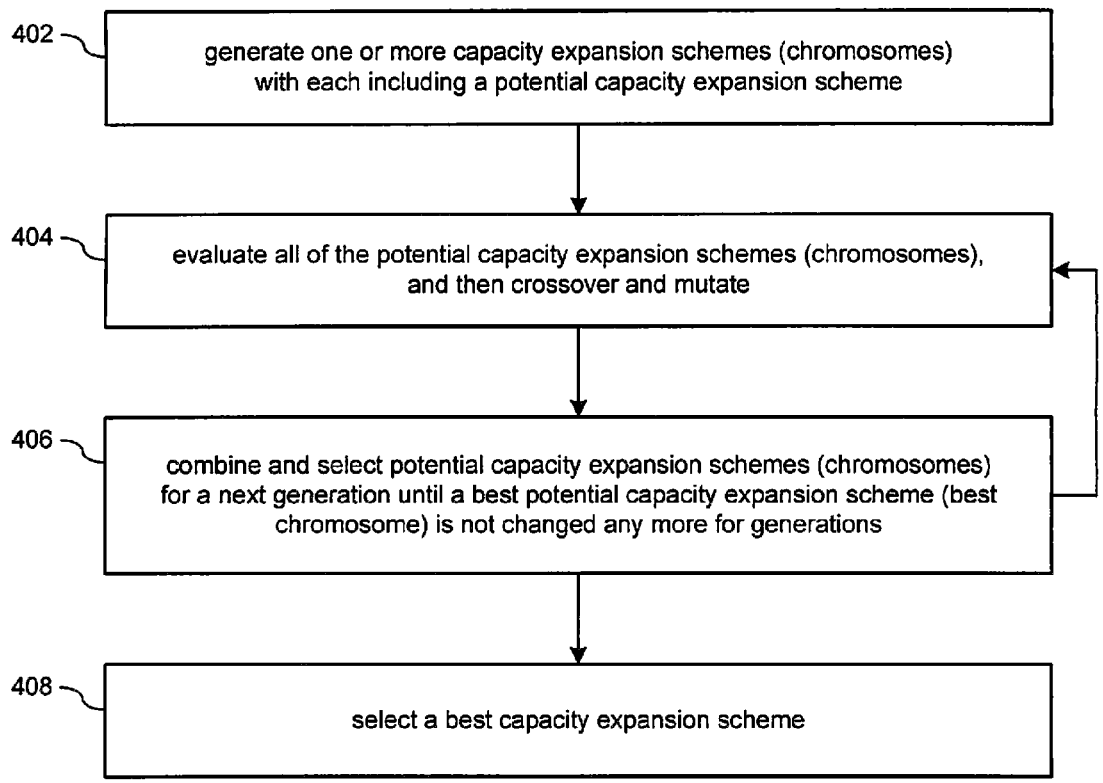

FIG. 4 is a process flow illustrating another example method 400 for managing capacity planning by implementing a forecast algorithm or a genetic algorithm for capacity expansion, in accordance with aspects of the disclosure.

In the example of FIG. 4, operations 402-408 are illustrated as separate, sequential operations. However, it should be appreciated that two or more of the operations 402-408 may be conducted in a partially or completely overlapping or parallel manner. Moreover, the operations 402-408 may be implemented in a different order than that shown, and it should be appreciated that additional or alternative operations, not specifically illustrated in the example of FIG. 4, may be included, and one or more of the operations 402-408 may be omitted. Further, as illustrated with respect to the operations 410-408, various ones of the operations 402-408 may be implemented in an iterative, looped, or nested fashion, or otherwise may be implemented in an order and manner consistent with obtaining a desired capacity expansion planning result from one or more of the system 100 of FIG. 1 and the system 150 of FIG. 1B.

At 402, the method 400 may be configured to generate one or more capacity expansion schemes (chromosomes), wherein each generated capacity expansion scheme (chromosome) includes a potential capacity expansion scheme. For instance, the systems 100, 150 may be configured to compare a plurality of capacity expansion schedule chromosomes, wherein each capacity expansion chromosome includes one or more potential capacity expansion schemes for each production resource 160 and production budget 180 within the one or more time intervals based on the production patterns for each production resource 160 and the budget patterns for each production budget 180. The systems 100, 150 may be further configured to compare each of the plurality of capacity expansion schedule chromosomes relative to the production capacity and the production cash flow, to thereby output a selected subset of the plurality of capacity expansion forecast chromosomes. The systems 100, 150 may be further configured to combine the capacity expansion schedule chromosomes of the selected subset of the plurality of capacity expansion schedule chromosomes to obtain a next generation of capacity expansion schedule chromosomes and for subsequent comparison therewith of the next generation of capacity expansion schedule chromosomes with respect to the production capacity and the production cash flow, as part of an evolutionary loop of the plurality of capacity expansion forecast chromosomes. The systems 100, 150 may be further configured to monitor the evolutionary loop and select a selected capacity expansion schedule chromosome therefrom for implementation of the capacity expansion schedule based thereon.

In the example of FIG. 4, at 404, the method 400 may be configured to evaluate all of the potential capacity expansion schemes (chromosomes), and then crossover and mutate. For instance, the systems 100, 150 may be configured to use a forecast algorithm or a genetic algorithm to crossover one or more of the chromosomes by combining the chromosomes in a role of parents to execute a simulation of sexual crossover to obtain a new child chromosome, which may be part of a new generation of chromosomes that may provide further crossover with other members of the same generation as part of an evolutionary loop to optimize the capacity expansion scheduling process. Thus, the systems 100, 150 may be configured to provide a forecast algorithm or a genetic algorithm as a computer simulation of Darwinian natural selection that iterates through various generations to converge toward a best solution in the problem space. Further, in reference to mutation, one of the chromosomes may be randomly selected, then a position (i.e., gene) within the selected chromosome may be selected for mutation, and then the value of the randomly selected position (i.e., gene) may be randomly changed or mutated to produce one or more new characteristics that were not previously available.

At 406, the method 400 may be configured to combine and select potential capacity expansion schemes (chromosomes) for a next generation until a best potential capacity expansion scheme (best chromosome) is not changed any more for generations. In an example, the operations at 410 and 412 may be repeated or cycled until the best potential capacity expansion scheme (best chromosome) is achieved for subsequent selection. By using a forecast algorithm or a genetic algorithm, a best reasonable capacity expansion scheme may be selected or determined for one or more forthcoming capacity expansions in a closed circle or loop.

At 408, the method 400 may be configured to select a best capacity expansion scheme with optimized or maximized production capacity and/or production cash flow. In an implementation, by using the forecast algorithm or genetic algorithm, a best reasonable capacity expansion scheme may be selected or determined for at least one forthcoming capacity expansion plan in reference to each production resource 160 and/or each production budget 180 while considering the optimized or maximized production capacity and/or production cash flow for each production resource 160 and/or each production budget 180.

Figure 5:
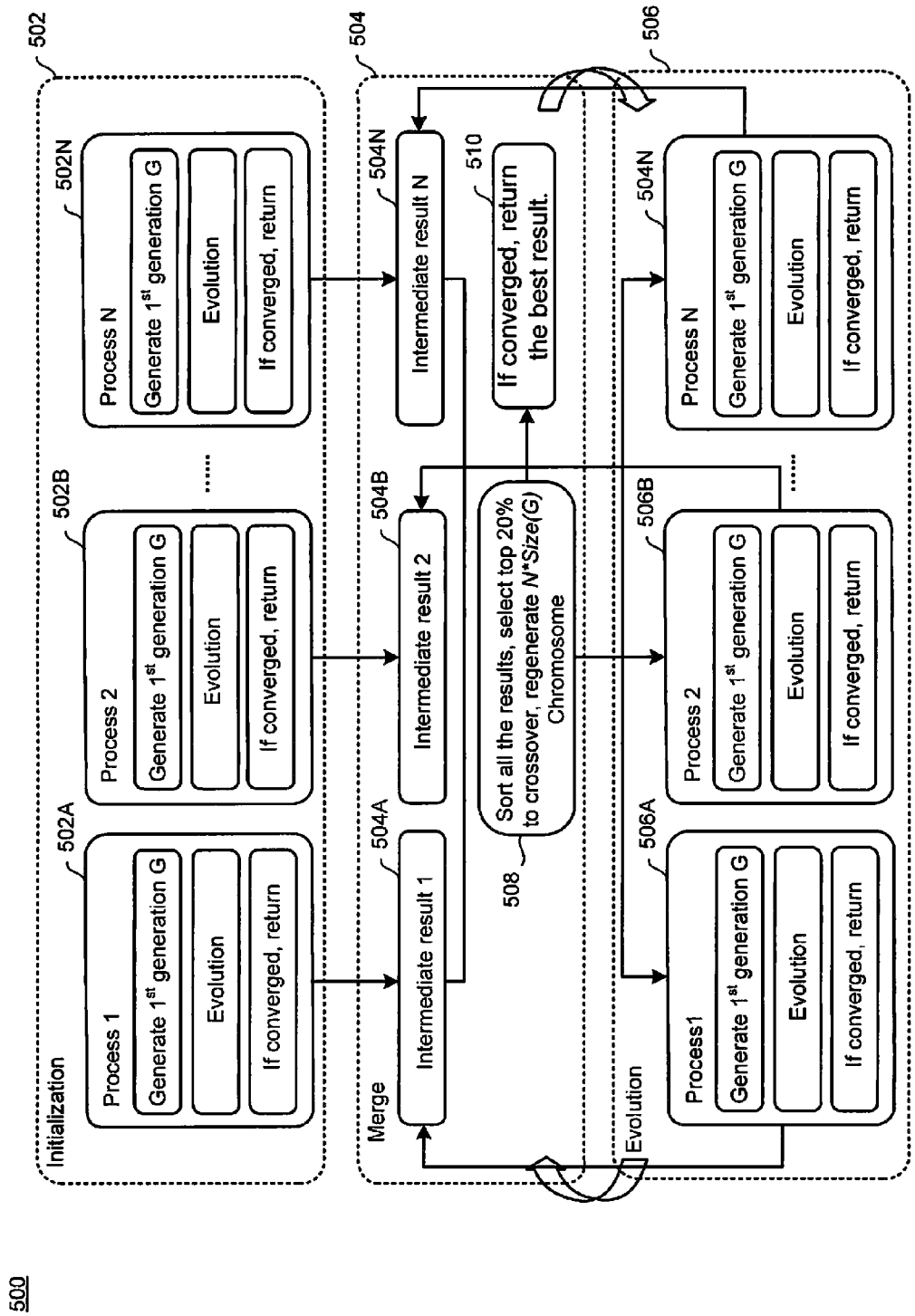
FIG. 5 is a block diagram illustrating an example framework for managing capacity planning, in accordance with aspects of the disclosure.

FIG. 5 is a block diagram illustrating an example framework 500 for managing capacity planning by implementing a forecast algorithm or a genetic algorithm for capacity expansion planning in a manner consistent with methods provided herein. In an implementation, the framework 500 illustrates a parallel framework in which the various operations of the production activity optimizer 126 and the forecast handler 130 of FIG. 1A may be parallelized to obtain faster, more efficient results. In another implementation, the framework 500 illustrates a parallel framework in which the various operations of the production activity optimizer 126 and the genetic algorithm handler 131 of FIG. 1B may be parallelized to obtain faster, more efficient results.

In this regard, two, three, or more processors may be utilized to divide tasks of a larger computational task so as to obtain computational results in a faster, more efficient manner. Such parallelization may include division of subtasks to be executed in parallel among a specified number of processors, whereupon independent, parallel processing of the assigned subtasks may proceed, until such time as it may be necessary or desired to rejoin or otherwise combine results of the parallel threads of computation into a unified intermediate or final result for the computational task as a whole.

In this regard, it should be appreciated that such parallelization may be implemented using any multi-computing platform in which a plurality of processors, central processing units (CPUs), or other processing resources are available, including network/device clusters. For example, such parallel processing may utilize existing SMP/CMP (Symmetrical Multi-Processing/Chip-level Multi-Processing) servers. Thus, in this description, it should be appreciated that the described processes may each be executed using such a corresponding unit(s) of processing power within any such environment in which multiple processing options are available. For example, it may be appreciated that the at least one processor 110 of FIG. 1 may be understood to represent any two or more of the above-referenced implementations for executing parallel processing, or other platforms for parallel processing, as would be apparent.

In the example of FIG. 5, an initialization stage 502 is illustrated in which "N" processes 502A, 502B, . . . 502N are illustrated. As illustrated, each process 502A-502N represents a separate instance of the above-described evolutionary loop of the forecast handler 1030 or the genetic algorithm handler 131. Specifically, as shown in each of the processes 502A-502N, a generation "G" of chromosomes may be generated, whereupon evolution of subsequent generations of chromosomes may be conducted, until such time as if and when the production activity optimizer 126 may identify a desired type and extent of convergence. As may be appreciated, the chromosome generations of the initial processes 502A-502N may be generated in random fashion. In other example implementations, the initial populations may be generated using one or more techniques designed to provide at least a high level of design which attempts to optimize associated schedules, or at least to eliminate inclusion of unworkable or otherwise undesirable potential schedules.

In a subsequent merge stage 504, intermediate results 504A, 504B . . . 504N may be combined, so that, in an operation 508, the combined results may be sorted, and the top 20% (or other designated portion) may be selected for use in creating a subsequent generation of chromosomes. Specifically, the selected portion of a current generation of chromosomes may be utilized to perform the types of crossovers described herein, or other known types of crossovers.

In the example of FIG. 5, individual pairs of chromosomes may be crossed over multiple times, for example, such that a subsequent generation of chromosomes includes N*size (G) chromosomes (i.e., includes a same number of chromosomes as a current generation). For instance, in the example of FIG. 5, since a top 20% of sorted chromosomes may be selected, each pair of chromosomes may be utilized to generate a plurality of new child chromosomes so as to maintain a same number of chromosomes in each generation.

If the overall operation is designated as having converged in conjunction with the operation 508, then the best result (i.e., the chromosome representing the best schedule according to the designated metric of profit maximum and/or utilization maximization) may be returned, as shown in operation 510. Otherwise, an evolution operation 506 may proceed with a re-parallelization of the new, child chromosome population generated in the operation 508.

Specifically, as shown, processes 506A, 506B . . . 506N may execute a new, current iteration of processing of the generated population chromosomes, in a manner that is substantially identical to the processes 502A, 502B . . . 502N with respect to the initialization operations 502. Subsequently, intermediate results 504A, 504B . . . 504N corresponding respectively to the processes 506A, 506B . . . 506N may be merged for subsequent sorting, crossover, and regeneration in the context of the operation 508. As may be appreciated, the operations 502, 504, 506 may proceed until convergence is reached at operation 510, and a best or best available result is obtained.

Figure 6:
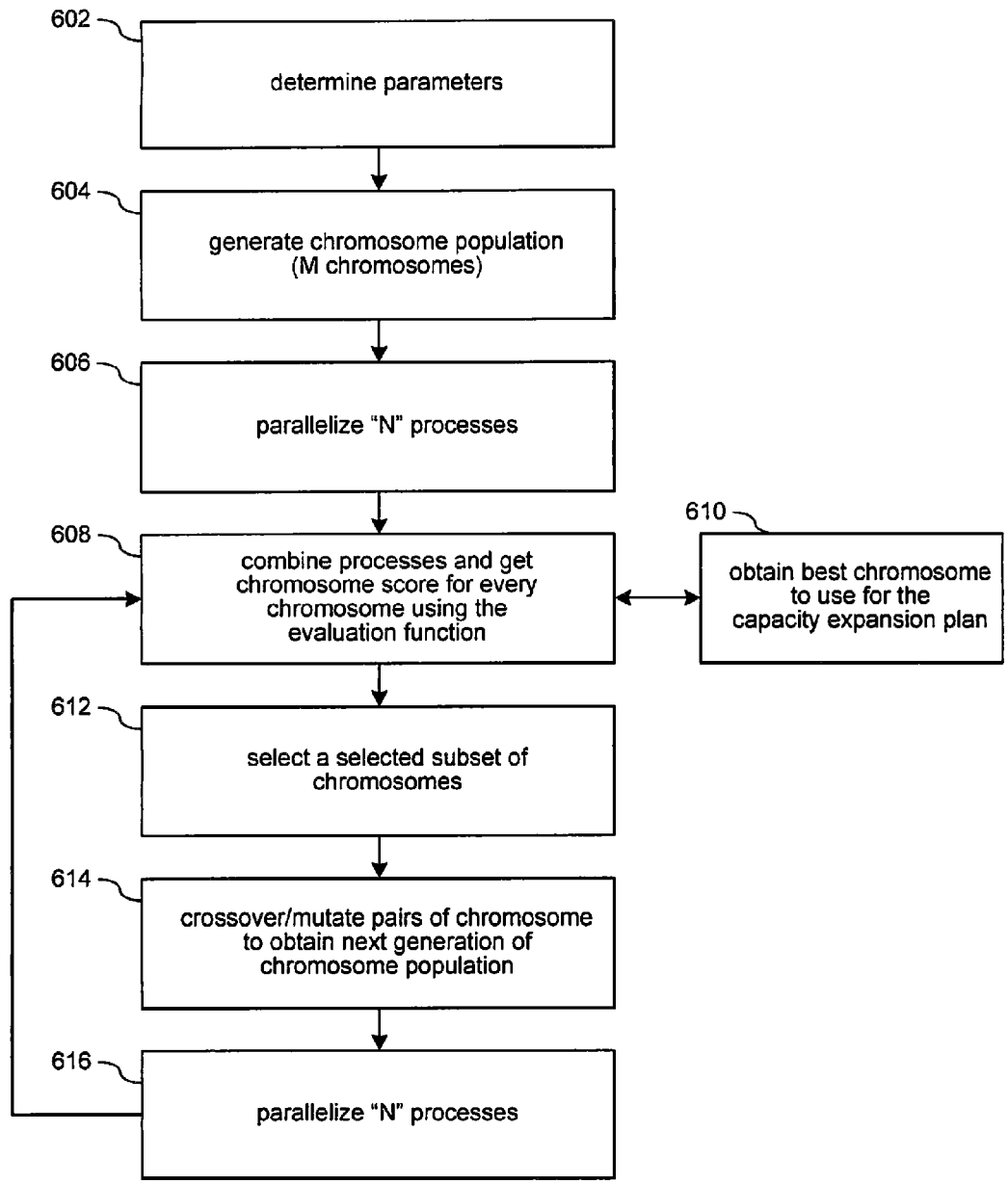
FIG. 6 is a process flow illustrating another example method for managing capacity planning, in accordance with aspects of the disclosure.

FIG. 6 is a process flow illustrating another example method 600 for managing capacity planning by implementing a forecast algorithm or a genetic algorithm for capacity expansion planning in a manner consistent with reference to the operations of the framework 500 of FIG. 5.

At 602, parameters may be determined. For example, parameters that characterize various portions of the chromosomes to be constructed and/or against which viability of the chromosomes may be judged, as well as a preferences received from a user for performing such judgments, (e.g., generating one or more potential capacity expansion forecasting schemes for each production resource and production budget based on the accounts receivable patterns for each asset and the accounts payable patterns for each liability while maintaining the cash reserve at the predetermined threshold), may be determined. For instance, as described, a user of the system 100 of FIG. 1 may utilize the GUI 152 to identify, designate, provide, or otherwise determine such information.

At 604, an initial chromosome population of "M" chromosomes may be generated. For example, the chromosome generator 128 may generate the first generation G of the processes 502A, 502B . . . 502N of FIG. 5.

At 606, "N" processes may be parallelized. For example, FIG. 5 illustrates an example of parallelization of "N" processes, e.g., in the initialization stage 502.

At 608, a chromosome score for every chromosome of the generation may be obtained by combining the various processes and using an appropriate evaluation function. For example, the chromosome comparator 134 may utilize such an evaluation function to associate a score with each chromosome of the generation. If convergence is reached according to one or more pre-determined criteria, then a best available capacity expansion forecast chromosome may be selected for use. For instance, if a chromosome receives a sufficiently high score, or if overall operations of the method 600 have provided a designated number of generations of chromosomes and/or have taken a designated total amount of time, then convergence may be understood to have occurred.

Otherwise, at 612, a selected subset of chromosomes may be selected. For example, the chromosome comparator 134 may select a top 20% of chromosomes as scored by the evaluation function.

At 614, pairs of the selected chromosomes may be subjected to crossovers and/or mutation to obtain a subsequent generation of chromosomes. For example, the chromosome combiner 136 may implement a type of crossover or combination in a manner as described herein.

At 616, parallelization of a subsequent "N" processes may proceed. For example, the chromosome comparator 134 may parallelize the end processes 506A, 506B . . . 506N as part of the evolution operation 506. In this way, a number of generations of chromosomes may be provided, until a suitable chromosome to use for the capacity expansion plan may be obtained at 610.

In accordance with aspects of the disclosure, referring to FIGS. 1A-6, the system 100 may utilize a heuristic-based algorithm for capacity expansion planning such as, for example, with the capacity planning manager 120 utilizing the forecast handler 130 or the genetic algorithm handler 131 for capacity expansion planning by generating potential capacity expansion forecasting scheme(s) for each production resource 160 and each production budget 180.

In an implementation, referring to table 1, a total budget may be used as a constraint to expand production resources, as denoted by $x_1$. Under that constraint, the capacity planning manager 120 may choose to add one or more of $x_1$ part production lines, $x_2$ assembly lines, and $x_3$ size of warehouse, . . . $x_n$, wherein unit cost of each type may be denoted by $c_1, c_2, c_3, \ldots, c_n$, correspondingly. As such, the capacity planning manager 120 may be configured to denote an update plan (e.g., capacity expansion plan) by using the following table 1.

TABLE 1

| Addition Capacity Type | Number | Unit Cost |
| --- | --- | --- |
| Parts Production Line | $x_1$ | $c_1$ |
| Assembly Line | $x_2$ | $c_1$ |
| Warehouse Size | $x_3$ | $c_3$ |
| . . . | . . . | . . . |
| Other capacities/resources needed | $x_n$ | $c_n$ |

In an example, the constraint may be expressed as $X^T C < B$. In another example, since the components in vector X should be integer in some closed intervals, a set of solutions $\{X_i\}$ may be retrieved to minimize a positive difference of $B - X^T C$.

These solutions may be traversed and evaluated using aspects of the genetic algorithm based scheduling method although any other production scheduling algorithm may be used.

Figure 7:
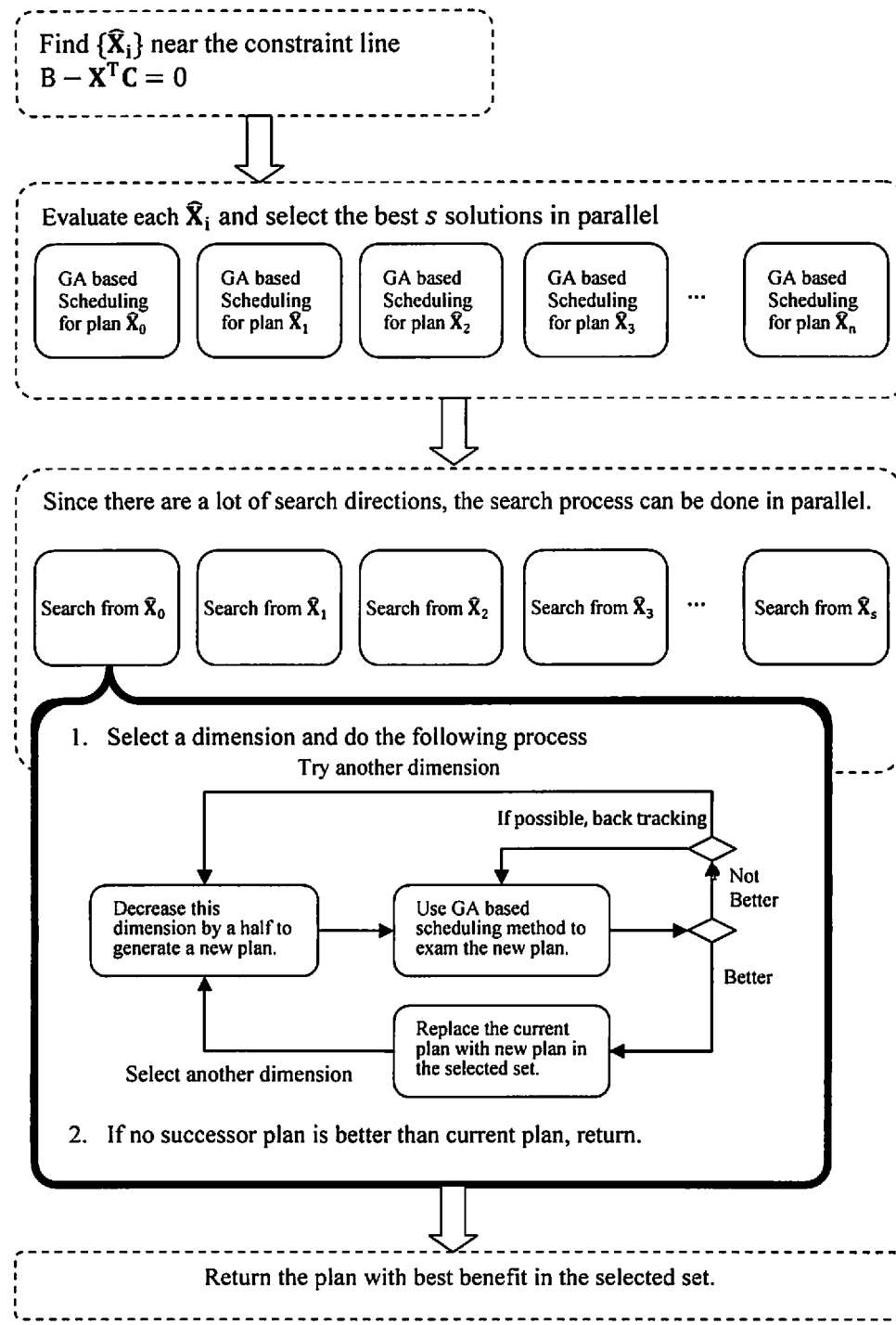
FIG. 7 is a block diagram illustrating another example framework for managing capacity planning, in accordance with aspects of the disclosure.
Figure 8:
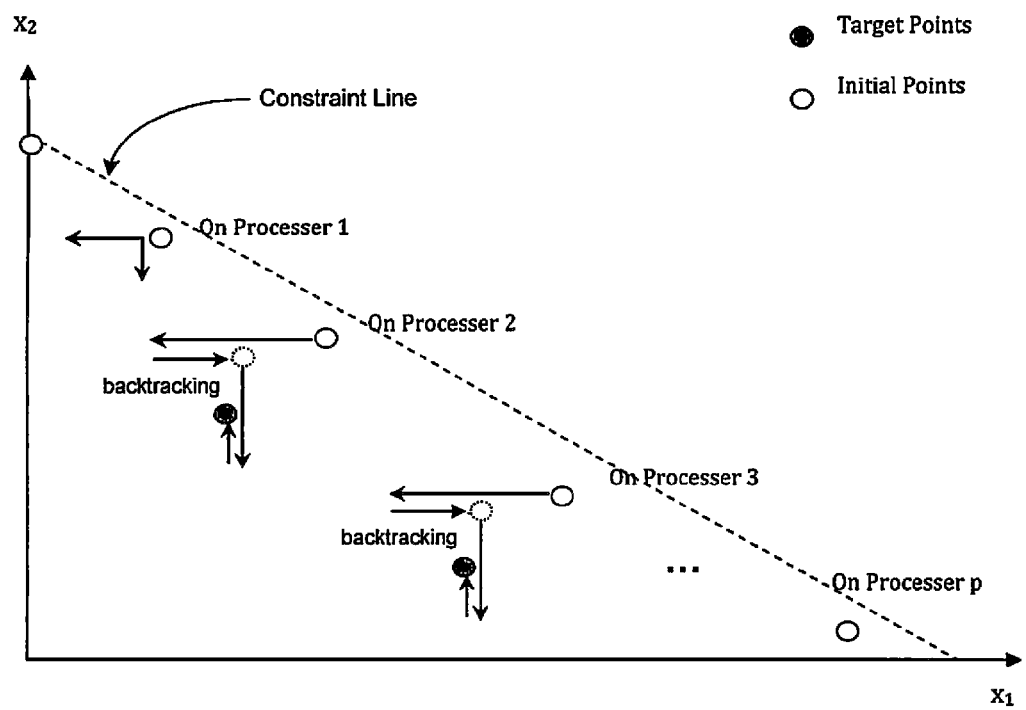
FIG. 8 is a graphical example of implementing the example framework of FIG. 7 for managing capacity planning, in accordance with aspects of the disclosure.
Figure 9:
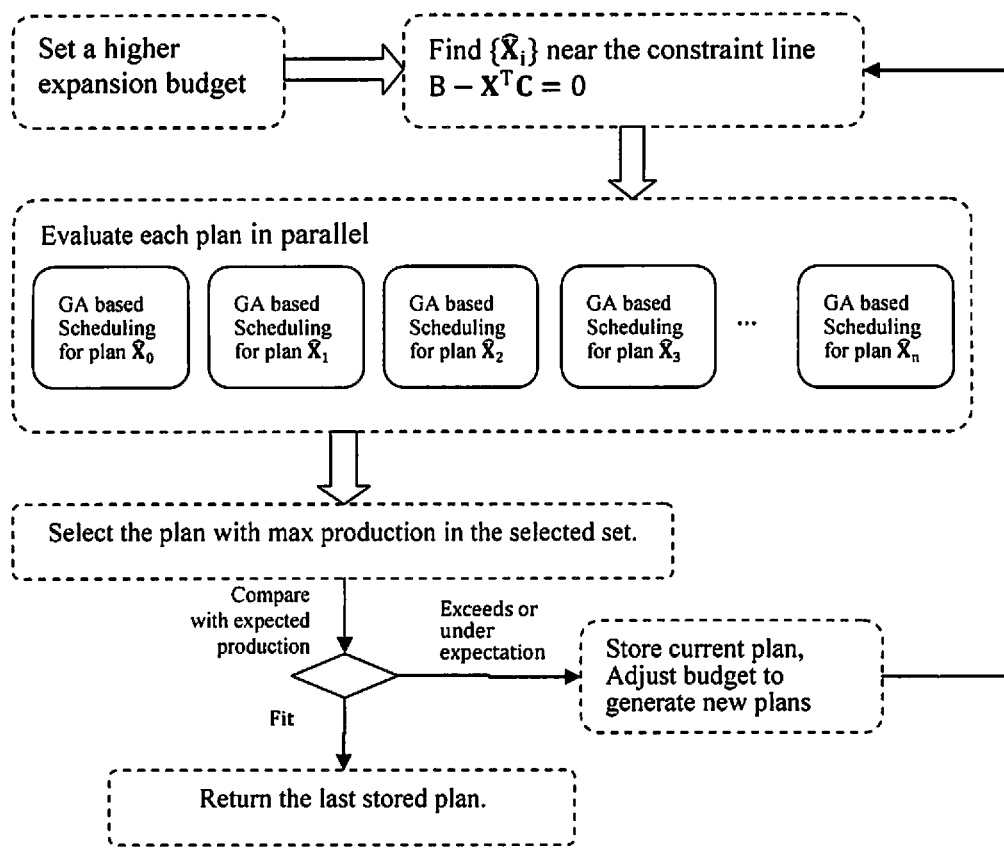
FIG. 9 is a block diagram illustrating still another example framework for managing capacity planning, in accordance with aspects of the disclosure.

In various implementations, referring to scenarios of FIGS. 7-9, the capacity planning manager 120 may be configured to use different search strategies to generate an optimal capacity expansion plan. For instance, FIG. 7 refers to an example framework 700 for managing capacity planning by the capacity planning manager 120, FIG. 8 refers to a graphical example 800 of implementing the example framework 700 for managing capacity planning by the capacity planning manager 120, and FIG. 9 refers to another example framework 900 for managing capacity planning by the capacity planning manager 120, in accordance with aspects of the disclosure.

In the example scenario of FIGS. 7-8, the capacity planning manager 120 may be configured to implement the example framework 700 to generate an optimal capacity expansion plan for a given fixed amount of a maximum budget and a fixed expectation of demand, wherein for instance, the capacity planning manager 120 attempts to generate the optimal capacity expansion plan to maximize profit.

In reference to the example scenario of FIG. 7, the capacity planning manager 120 may be configured to find $\{X_i\}$ near a constraint line: $B - X^T C = 0$.

The capacity planning manager 120 may be configured to evaluate each $X_i$ and select best s solution(s) in parallel, wherein for example, genetic algorithm (GA) based scheduling for plans $x_0, x_1, x_2, x_3, \ldots, x_n$ may be evaluated in parallel. As such, the capacity planning manager 120 may be configured to execute the search process in parallel, wherein a separate search may begin from each plan $x_0, x_1, x_2, x_3, \ldots, x_n$.

The capacity planning manager 120 may be configured to select a dimension and execute another process by using the GA based scheduling method to examine each new plan to achieve a better plan to thereby replace a current plan with the new plan in the selected set. Another dimension may be selected, wherein the dimension is decreased by half to generate another new plan. The GA based scheduling method may be repeated to examine another new plan to achieve another better plan. Otherwise, if a better plan is not achieved, then backtracking may be used by the GA based scheduling method to examine another new plan to achieve a better plan, or the GA based scheduling method may try another dimension to examine another plan to achieve a better plan.

The capacity planning manager 120 may be configured to return, if no successor plan is better than a current plan. Otherwise, if a successor plan is better than a current plan, the capacity planning manager 120 may be configured to return with a plan with the best benefit in the selected set.

In an implementation, without loss of generality, it may be assumed that $x_1$ parts production lines and $x_2$ assembly lines may be added. With a given total budget B, a boundary line of a possible $<x_1, x_2>$ combination point may be drawn according to the following formula (where some other costs may be ignored, such as warehouse size).

$$c_1 x_1 + c_2 \tag{1}$$

As $c_1$ and $c_2$ should be positive integers, a possible initial solution set $\{\hat{X}_i\}$ may be achieved near the boundary line. FIG. 8 shows the graphical example 800 as an example of implementing of this process.

In the example of FIG. 8, the capacity planning manager 120 with the forecast handler 130 or the genetic algorithm handler 131 may be configured to generate one or more potential capacity expansion forecasting schemes for each production resource and production budget by establishing a constraint reference line related to each production resource and each production budget, and under the constraint line, iteratively moving an initial reference point to a target reference point. As shown in FIG. 8, this may be achieved by moving the initial reference point in a first direction toward a first position, overshooting the initial reference point in the first direction past the first position, backtracking the initial reference point in a direction opposite the first direction toward the first position, moving the initial reference point in a second direction different than the first direction toward a second position, overshooting the initial reference point in the second direction past the second position, and backtracking the initial reference point in a direction opposite the second direction toward the target reference point.

In an implementation, since there are many search directions, the search process may be executed in parallel. For example, as shown in FIG. 8, the constraint may be expressed by a line (i.e., the constraint line), and the initial reference points may be chosen from plans nearest to the constraint line, and these plans may be evaluated and chosen for a best s plans as a start point set. Then, the search processes may be started in parallel. For each processor $1, 2, 3, \ldots, p$, the search processes may be the same. In this example, the $x_2$ dimension may be fixed, and the best $x_1$ may be found that may generate the best profit with current $x_2$. With found $x_1$, the same process may be used to find the best $x_2$. Then, every process may hold a "best" solution. The final solution, which may provide the best profit, may be found easily from the selected solutions.

In an implementation, the following pseudo code for the first example scenario of FIGS. 7-8 comprises example instructions that, when executed by at least one processor, are configured to generate an optimal capacity expansion plan for a given fixed amount of a maximum budget and a fixed expectation of demand, wherein for instance, the capacity planning manager 120 attempts to generate the optimal capacity expansion plan to maximize profit.

EXAMPLE PSEUDO CODE FOR SCENARIO 1

```
% x1: number of part production line
% x2: number of assembly line
% p : number of processors
1.   FUNCTION Capacity_Planning_Profit
2.   BEGIN
3.   Compute initial solution set {X̂_i}, using formula B − X^T C = 0,
     assume there are n solution (Constraints)
4.
5.   % Evaluate each X̂_i and select the best s solutions (constraints)
     with best GA evaluation results in parallel
6.   On processor 1:
7.     FOR i = 0 to n/p
8.       CALL FUNCTION GA, find the solution and calculate the
         corresponding profit
9.     END FOR
10.  On processor 2:
11.    FOR i = n/p+1 to 2n/p
12.      CALL FUNCTION GA, find the solution and calculate the
         corresponding profit
13.    END FOR
14.  ...
15.  On processor p:
16.    FOR i = n−n/p to n
17.      CALL FUNCTION GA, find the solution and calculate the
         corresponding profit
18.    END FOR
19.
20.  Select the best s solutions as start search point Set {X̂_i}
21.
22.  % Since there are a lot of search directions, the search process
     can be done in parallel.
23.  On processor 1:
24.    FOR i = 0 to s/p
25.      Start form X̂_i, Select a dimension
26.      Decrease this dimension by a half to generate a new plan.
27.      CALL FUNCTION GA, calculate the profit and generate
         new plan
28.      IF profit better
29.      THEN
30.        Replace the current plan with new plan in the selected set.
31.        select another dimension, back to step 26
32.      ELSE
33.        IF possible, back tracking
34.        ELSE try another dimension, back to step 26
35.      END IF
36.      END IF
37.    END FOR
38.  ...
39.  On processor p:
40.    FOR i = s−s/p to s
41.      Start form X̂_i, Select a dimension
42.      Decrease this dimension by a half to generate a new plan.
43.      CALL FUNCTION GA, calculate the profit and
         generate new plan
44.      IF profit better
45.      THEN
46.        Replace the current plan with new plan in the selected set.
47.        select another dimension, back to step 42
48.      ELSE
49.        IF possible, back tracking
```

```
50.    ELSE try another dimension, back to step 42
51.    END IF
52.    END IF
53.    END FOR
54.
55. END
```

In the example scenario of FIG. 9, the capacity planning manager 120 may be configured to implement the example framework 900 to generate an optimal capacity expansion plan for a given demand beyond a current capacity, wherein for instance, the capacity planning manager 120 attempts to determine a capacity expansion plan with lowest needed budget to produce all demanded products.

In reference to the example scenario of FIG. 9, the capacity planning manager 120 may be configured to set a higher expansion budget.

The capacity planning manager 120 may be configured to find $\{X_i\}$ near a constraint line: $B-X^TC=0$.

The capacity planning manager 120 may be configured to evaluate each plan in parallel, wherein for example, genetic algorithm (GA) based scheduling for plans $x_0$, $x_1$, $x_2$, $x_3$, . . . , $x_n$ may be evaluated in parallel. As such, the capacity planning manager 120 may be configured to execute the search process in parallel, wherein a separate search may begin from each plan $x_0$, $x_1$, $x_2$, $x_3$, . . . , $x_n$.

The capacity planning manager 120 may be configured to select a plan with a maximum production in the selected set and compare the selected plan with an expected production. If the selected plan is determined to fit the expected production, then the last stored plan is returned. Otherwise, if the selected plan exceeds or is under the expected production, then the current plan is stored, the production budget is adjusted to generate one or more new plans, and the process repeats by returning to find $\{X_i\}$ near a constraint line: $B-X^TC=0$.

In an implementation, the following pseudo code for the second example scenario of FIG. 9 comprises example instructions that, when executed by at least one processor, are configured to generate an optimal capacity expansion plan for a given demand beyond a current capacity, wherein for instance, the capacity planning manager 120 attempts to determine a capacity expansion plan with lowest needed budget to produce all demanded products.

EXAMPLE PSEUDO CODE FOR SCENARIO 2

```
% x1: number of part production line
% x2: number of assembly line
% p : number of processors
1.   FUNCTION Capacity_Planning_Capacity
2.   BEGIN
3.     Set a higher expansion budget
4.     Compute initial solution set {X̂_i}, using formula B - X^T C = 0,
       assume there are n solution
5.
6.     % Evaluate each X̂_i and select the best s solutions in parallel
7.     On processor 1:
8.       FOR i = 0 to n/p
9.         CALL FUNCTION GA, find the solution and calculate the
           corresponding profit
10.      END FOR
11.    On processor 2:
12.      FOR i = n/p+1 to 2n/p
13.        CALL FUNCTION GA, find the solution and calculate the
           corresponding profit
14.      END FOR
15.    ...
16.    On processor p:
17.      FOR i = n-n/p to n
18.        CALL FUNCTION GA, find the solution and calculate
           the corresponding profit
19.      END FOR
20.    Select the plan with max production in the selected set.
21.    IF production as expected
22.      Return the last stored plan
23.    ELSE
24.      Store current plan, Adjust budget to generate new plans
25.      Return to Step 5
26.    END IF
27.    Select the plan with maximum production.
```

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, may be written in any form of programming language, including compiled or interpreted languages, and may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for user interaction, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other types of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of networks, such as communication networks, may include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system including instructions recorded on a non-transitory computer-readable medium and executable by at least one processor, the system comprising:
   a capacity planning manager configured to cause the at least one processor to generate a capacity expansion plan for a plurality of production resources used to produce one or more products relative to one or more time intervals, wherein the capacity planning manager includes:
      a production handler configured to retrieve information related to each production resource from a database and evaluate production patterns for each production resource to determine a production capacity within the one or more time intervals;
      a budget handler configured to retrieve information related to one or more production budgets from the database and evaluate budget patterns for each production resource to determine a production cash flow within the one or more time intervals;
      a forecast handler configured to generate one or more potential capacity expansion forecasting schemes for each production resource and production budget based on the production patterns for each production resource and the budget patterns for each production budget; and
      a production activity optimizer configured to generate the capacity expansion plan within the one or more time intervals based on the one or more potential capacity expansion forecasting schemes for each production resource and production budget,
   the forecast handler and the production activity optimizer being configured to implement a genetic algorithm by creating, comparing, and combining capacity expansion forecast chromosomes that represent the potential capacity forecasting schemes to create a new generation of capacity expansion forecast chromosomes for evaluation such that a subset is selected for reproduction and subsequent evaluation, each generation of capacity expansion forecast chromosomes converging towards a particular capacity expansion forecast chromosome that is used to generate the capacity expansion plan,
   the capacity planning manager being configured to adjust a schedule of operations of the plurality of production resources based on the capacity expansion plan.

2. The system of claim 1, further comprising:
a demand handler configured to determine a future demand for the one or more products during the one or more time intervals,
wherein the forecast handler is configured to generate the one or more potential capacity expansion forecasting schemes for each production resource and production budget based on the production patterns for each production resource and the budget patterns for each production budget while meeting the future demand.

3. The system of claim 1, further comprising:
a profitability handler configured to determine a profitability level for the one or more products during the one or more time intervals,
wherein the forecast handler is configured to generate the one or more potential capacity expansion forecasting schemes for each production resource and production budget based on the production patterns for each production resource and the budget patterns for each production budget while meeting the profitability level.

4. The system of claim 1, further comprising:
an investment handler configured to determine upfront capital investment needed to implement the capacity expansion plan for each production resource used to produce the one or more products within the one or more time intervals,
wherein the forecast handler is configured to generate the one or more potential capacity expansion forecasting schemes for each production resource and production budget based on the production patterns for each production resource and the budget patterns for each production budget while meeting the upfront capital investment.

5. The system of claim 1, further comprising:
a demand handler configured to determine a future demand for the one or more products during the one or more time intervals; and
a profitability handler configured to determine a profitability level relative to the future demand for the one or more products during the one or more time intervals,
wherein the forecast handler is configured to generate the one or more potential capacity expansion forecasting schemes for each production resource and production budget based on the production patterns for each production resource and the budget patterns for each production budget while meeting the future demand and profitability level.

6. The system of claim 1, further comprising:
a demand handler configured to determine a future demand for the one or more products during the one or more time intervals;
an investment handler configured to determine upfront capital investment needed to implement the capacity expansion plan for each production resource used to produce the one or more products within the one or more time intervals; and
a profitability handler configured to determine a profitability level relative to the future demand for the one or more products during the one or more time intervals and further relative to the upfront capital investment needed to produce the one or more products within the one or more time intervals, wherein the forecast handler is configured to generate the one or more potential capacity expansion forecasting schemes for each production resource and production budget based on the production patterns for each production resource and the budget patterns for each production budget while meeting the future demand, upfront capital investment, and profitability level.

7. The system of claim 1, wherein the production resources include one or more of at least one production line, at least one assembly line, at least one warehouse, at least one supplier, and at least one worker.

8. The system of claim 1, wherein:
the one or more production budgets comprises at least one fixed production budget, and
the production activity optimizer is further configured to generate the capacity expansion plan with a highest profitability level while meeting a future demand for each product.

9. The system of claim 1, wherein:
the one or more production budgets comprises a lowest needed production budget,
the production capacity comprises a current production capacity, and
the production activity optimizer is further configured to generate the capacity expansion plan with the lowest needed budget to produce each product for a future demand that is greater than the current production capacity.

10. The system of claim 1, wherein the forecast handler is configured to generate one or more potential capacity expansion forecasting schemes for each production resource and production budget by:
establishing a constraint reference line related to each production resource and production budget; and
under the constraint line, iteratively moving an initial reference point to a target reference point by:
moving the initial reference point in a first direction toward a first position,
overshooting the initial reference point in the first direction past the first position,
backtracking the initial reference point in a direction opposite the first direction toward the first position,
moving the initial reference point in a second direction different than the first direction toward a second position,
overshooting the initial reference point in the second direction past the second position, and
backtracking the initial reference point in a direction opposite the second direction toward the target reference point.

11. The system of claim 1, wherein the forecast handler comprises a genetic algorithm handler comprising:
a chromosome comparator configured to compare the capacity expansion forecast chromosomes based on the production patterns for each production resource and the budget patterns for each production budget, and configured to compare each of the capacity expansion forecast chromosomes relative to the production capacity and the production cash flow, to thereby output the subset of the capacity expansion forecast chromosomes; and
a chromosome combiner configured to combine capacity expansion forecast chromosomes of the subset of the capacity expansion forecast chromosomes to obtain a next generation of capacity expansion forecast chromosomes for output to the chromosome comparator and for subsequent comparison therewith of the next generation of capacity expansion forecast chromosomes with respect to the production capacity and the production cash flow, as part of an evolutionary loop of the capacity expansion forecast chromosomes between the chromosome comparator and the chromosome combiner,
wherein the production activity optimizer is further configured to monitor the evolutionary loop and select the particular capacity expansion chromosome therefrom for implementation of the capacity expansion plan based thereon.

12. The system of claim 11, wherein the chromosome combiner is further configured to combine the capacity expansion forecast chromosomes including selecting pairs of capacity expansion forecast chromosomes and crossing over portions of each pair of capacity expansion forecast chromosomes to obtain a child chromosome of the next generation.

13. The system of claim 11, wherein at least a portion of the evolutionary loop is executed using parallel processes in which each generation of capacity expansion forecast chromosomes is divided into sub-groups for parallel processing thereof.

14. The system of claim 11, wherein the production activity optimizer is further configured to select the particular capacity expansion forecast chromosome after a predetermined number of generations of the evolutionary loop, or after determining that the particular capacity expansion forecast chromosome satisfies the production capacity and the production cash flow.

15. The system of claim 1, wherein the production activity optimizer is configured to:
evaluate each potential capacity expansion forecasting scheme for each production resource and each production budget; and
select a best potential capacity expansion forecasting scheme by considering one or more of a future demand for each product, a profitability level for each product, and an upfront capital investment needed for each product.

16. A computer-implemented method, comprising:
generating a capacity expansion plan for a plurality of production resources used to produce one or more products relative to one or more time intervals by:
retrieving information related to each production resource from a database;
evaluating production patterns for each production resource to determine a production capacity within the one or more time intervals;
retrieving information related to one or more production budgets from the database;
evaluating budget patterns for each production resource to determine a production cash flow within the one or more time intervals;
generating one or more potential capacity expansion forecasting schemes for each production resource and production budget based on the production patterns for each production resource and the budget patterns for each production budget;
generating the capacity expansion plan within the one or more time intervals based on the one or more potential capacity expansion forecasting schemes for each production resource and production budget,
the capacity expansion plan being generated based on an implementation of a genetic algorithm by creating, comparing, and combining capacity expansion forecast chromosomes that represent the potential capacity forecasting schemes to create a new generation of capacity expansion forecast chromosomes for evaluation such that a subset is selected for reproduction and subsequent evaluation, each generation of capacity expansion forecast chromosomes converging towards a particular capacity expansion forecast chromosome that is used to generate the capacity expansion plan; and adjusting a schedule of operations of the plurality of production resources based on the capacity expansion plan.

17. The method of claim 16, further comprising:

comparing the capacity expansion forecast chromosomes based on the production patterns for each production resource and the budget patterns for each production budget;

comparing each of the capacity expansion forecast chromosomes relative to the production capacity and the production cash flow to thereby output the subset of the capacity expansion forecast chromosomes;

combining capacity expansion forecast chromosomes of the subset of the capacity expansion forecast chromosomes to obtain a next generation of capacity expansion forecast chromosomes for output and for subsequent comparison therewith of the next generation of capacity expansion forecast chromosomes with respect to the production capacity and the production cash flow, as part of an evolutionary loop of the capacity expansion forecast chromosomes; and monitoring the evolutionary loop and selecting the particular capacity expansion chromosome therefrom for implementation of the capacity expansion plan based thereon.

18. The method of claim 17, further comprising:

combining the capacity expansion forecast chromosomes including selecting pairs of capacity expansion forecast chromosomes and crossing over portions of each pair of capacity expansion forecast chromosomes to obtain a child chromosome of the next generation, wherein at least a portion of the evolutionary loop is executed using parallel processes in which each generation of capacity expansion forecast chromosomes is divided into sub-groups for parallel processing thereof.

19. A computer program product, the computer program product being tangibly embodied on a non-transitory computer-readable storage medium and comprising instructions that, when executed by at least one processor, are configured to:

generate a capacity expansion plan for a plurality of production resources used to produce one or more products relative to one or more time intervals, wherein the instructions, when executed by the at least one processor, are further configured to:

retrieve information related to each production resource from a database;

evaluate production patterns for each production resource to determine a production capacity within the one or more time intervals;

retrieve information related to one or more production budgets from the database;

evaluate budget patterns for each production resource to determine a production cash flow within the one or more time intervals;

generate one or more potential capacity expansion forecasting schemes for each production resource and production budget based on the production patterns for each production resource and the budget patterns for each production budget; and generate the capacity expansion plan within the one or more time intervals based on the one or more potential capacity expansion forecasting schemes for each production resource and production budget, the capacity expansion plan being generated based on an implementation of a genetic algorithm by creating, comparing, and combining capacity expansion forecast chromosomes that represent the potential capacity forecasting schemes to create a new generation of capacity expansion forecast chromosomes for evaluation such that a subset is selected for reproduction and subsequent evaluation, each generation of capacity expansion forecast chromosomes converging towards a particular capacity expansion forecast chromosome that is used to generate the capacity expansion plan; and, adjust a schedule of operations of the plurality of production resources based on the capacity expansion plan.

20. The computer program product of claim 19, further comprising instructions that, when executed by the processor, are configured to:

compare the capacity expansion forecast chromosomes based on the production patterns for each production resource and the budget patterns for each production budget;

compare each of the capacity expansion forecast chromosomes relative to the production capacity and the production cash flow to thereby output the subset of the capacity expansion forecast chromosomes;

combine capacity expansion forecast chromosomes of the subset of the—capacity expansion forecast chromosomes to obtain a next generation of capacity expansion forecast chromosomes for output and for subsequent comparison therewith of the next generation of capacity expansion forecast chromosomes with respect to the production capacity and the production cash flow, as part of an evolutionary loop of the capacity expansion forecast chromosomes; and monitor the evolutionary loop and select the particular capacity expansion chromosome therefrom for implementation of the capacity expansion plan based thereon.

21. The computer program product of claim 20, further comprising instructions that, when executed by the processor, are configured to:

combine the capacity expansion forecast chromosomes including selecting pairs of capacity expansion forecast chromosomes and crossing over portions of each pair of capacity expansion forecast chromosomes to obtain a child chromosome of the next generation, wherein at least a portion of the evolutionary loop is executed using parallel processes in which each generation of capacity expansion forecast chromosomes is divided into sub-groups for parallel processing thereof.

* * * * *